Patented June 3, 1930

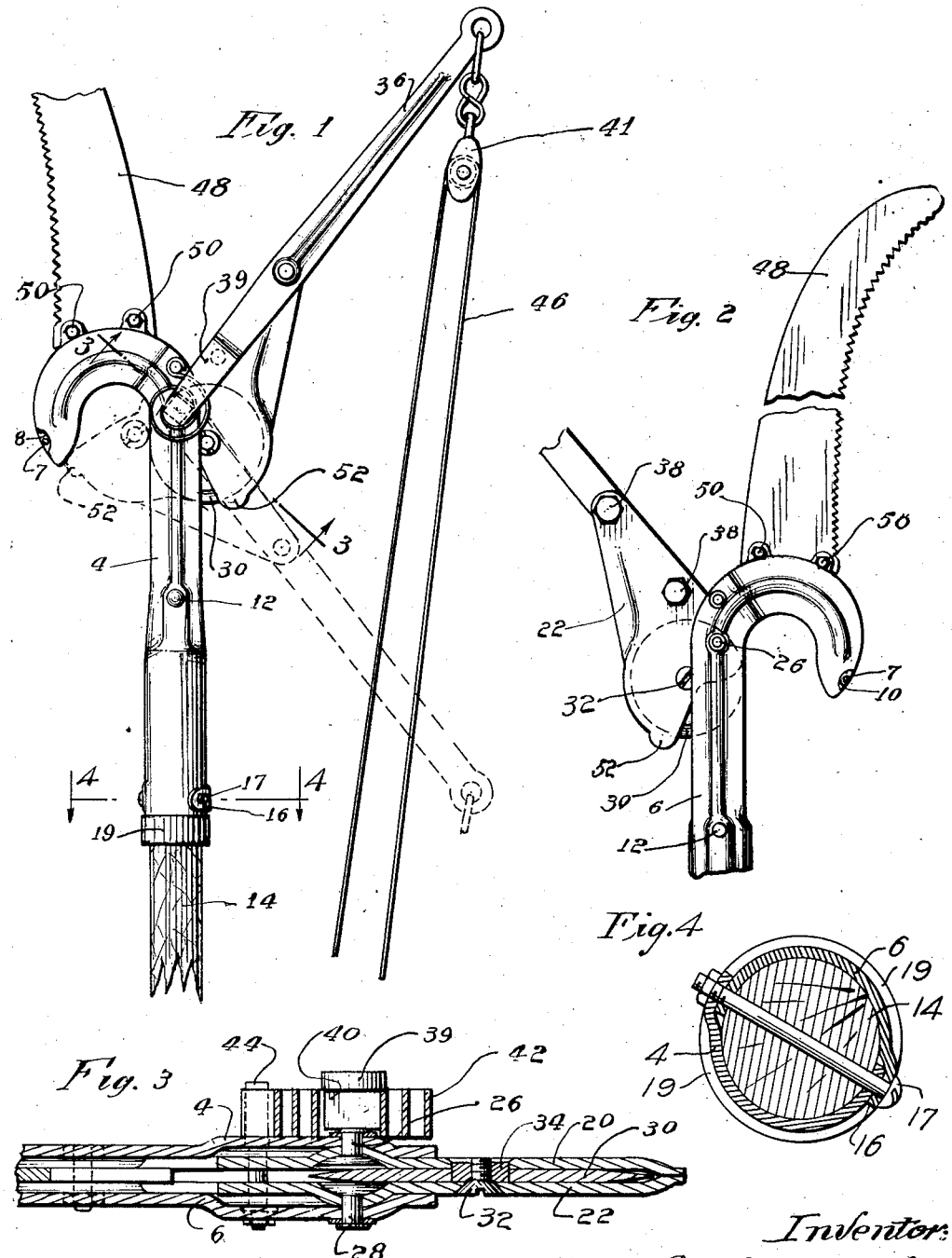

1,761,469

UNITED STATES PATENT OFFICE

MATHIAS DONKEL, OF CHICAGO, ILLINOIS, ASSIGNOR TO MATHIAS KLEIN & SONS, INC., OF CHICAGO, ILLINOIS, A CORPORATION OF ILLINOIS

TREE TRIMMER

Application filed July 21, 1927. Serial No. 207,480.

My invention relates generally to tree trimmers or pruning knives, and more particularly to implements of this class in which a rotary disc cutter is used.

It is an object of my invention to provide an implement of this type in which the disc cutter is large in diameter so as to provide a long peripheral cutting edge, and to provide improved means for actuating this cutter whereby the maximum practical leverage may be obtained without increasing the overall dimensions of the implement.

A further object is to provide an improved tree trimmer which is simple in construction, easily operable, and which may be economically manufactured.

Other objects will appear from the following description, reference being had to the accompanying drawings, in which Figure 1 is a side elevation of the trimmer, showing some of the parts in operated position in dotted lines;

Figure 2 is an elevation of the top portion of the trimmer taken from the side opposite that shown in Figure 1;

Figure 3 is a transverse cross sectional view taken on the line 3—3 of Figure 1; and Figure 4 is a cross sectional view taken on the line 4—4 of Figure 1.

The trimmer comprises a pair of left and right hand hook-shaped pressed steel frame members 4 and 6. The hook portions of these members are secured together by a rivet 7 passing through punch depressed portions 8 and 10 which thus properly spaced apart the members. A shouldered rivet 12 holds the shank portions of the frame members in the desired spaced relation. The lower ends of the shank portions are semicylindrical in shape, to form a socket for the pole 14 used in manipulating the device. Each of the frame members 4, 6, has an ear 16 adjacent its lower end which overlies the other member to form a reinforcement for holding a bolt 17 which passes diametrically through the frame members and the pole 14 to detachably secure these parts together. A collar or ferrule 19 is pressed over the lower end of the socket.

A pair of left and right hand guard plates 20 and 22 are pivotally mounted between the frame members 4 and 6 by rivets 26 and 28 respectively. These guard plates serve as a pivotal support for a disc shaped cutter which is rotatably mounted between these plates by a screw 32 and nut 34, which lie flush with the outer surfaces of the guard plates, the nut being provided with a kerf. The major portion of the nut forms a cylindrical bearing surface for the disc cutter 30. Due to the fact that the nut engages the inner surface of the guard plate 22, there is no tendency for the cutter to be clamped against rotation in the guard plates when the parts are assembled.

An operating lever 36 is attached to the guard plates 20, 22 by cap screws 38 which are threaded in the lever. This lever has an offset arm 39 formed integrally therewith which terminates in a squared inwardly projecting lug 40 which is co-axial with the rivets 26, 28. A coiled spring 42 of rectangular cross-section has its inner coil conformed to fit around this lug so as to be non-rotatable relative thereto and has its outer end anchored to a pin 44 which is bolted to the frame members 4, 6. No means are provided to secure the spring 42 to the lug 40 or to the pin 44, the inner and outer ends of the spring being conformed so as to easily slide over the lug and pin respectively. The spring may thus readily be removed and replaced in case of breakage or stress beyond its elastic limit merely by removing the lever 36. The outer end of the lever 36 is apertured to receive suitable means for attaching a pulley 41 through which a rope or cable 46 is passed. It will be understood that at least one end of the rope or cable is attached near the lower end of the pole 14 while the other end is adapted to be pulled by the operator.

If desired, a pruning saw 48 may be secured to the hook-shaped ends of the frame members 4, 6, by bolts 50 so that the implement may be used to saw the larger branches of the tree as well as to cut the smaller branches.

It will be noted that the plates 20, 22 are suitably shaped to provide a guard housing for the cutter to prevent injury to the operator in handling the implement and also to prevent damage to the blade while using the device. The pin 44 serves not only as an anchor for the spiral coil spring 42, but also as a stop to limit the upward movement of the lever 36 through engagement of the plates 20 and 22 with that portion of the pin which lies between the frame members 4 and 6. The operative stroke of the lever is limited by the engagement of the tips 52 of the plates 20 and 22 with the extremities of the hook-shaped portions of the frame members 4 and 6.

As shown in full lines in Figures 1 and 2, the cutter is in normal inoperative position, in which position the screw 32 and nut 34 lie partially between the frame members 4 and 6 so that the removal of the cutter is impossible. Upon actuation of the device to the position shown in dotted lines in Figure 1, the screw and nut are readily accessible so that the cutter may be removed for regrinding or replacement. The cutter 30 may be of large diameter and the hook portion shaped to correspond to the size of the cutter so that large branches may be cut. This is possible because of the great leverage which may be obtained due to the fact that the axis of oscillation of the cutter passes through the cutter, so that by this arrangement any desired leverage upon the cutter blade may be obtained. This feature is of great importance since it is not practical to increase the operating leverage by lengthening the lever 36 because a long lever would make the implement cumbersome and unwieldy.

The trimmer of my invention is operated in the usual manner by pulling on the rope or cable 46, thus pivoting the lever 36, guard plates 20 and 22 and disc cutter 30 about the rivets 26 and 28 until the tips 52 of the guard plates 20 and 22 abut against the extremities of the hook portions of the frame members 4 and 6, at which time the edge of the cutter will lie between the hook-shaped portions of the frame members. When the cutter engages a twig or branch it is automatically rotated slightly to bring a new portion of its cutting edge into operative position for the next succeeding cutting operation, thus causing the full length of the cutting edge to be used to the same extent.

While I have shown but a single embodiment of my invention, it will be apparent to those skilled in the art that changes may be made in the structure and design without departing from the principles thereof.

I therefore wish the scope of my invention to be limited only by the claims which follow:

1. In an implement of the class described, the combination of a pair of joined hook-shaped frame members, said members being spaced at their hook portions, a rotatable cutter, a pair of guard plates carrying said cutter, means for pivotally mounting said plates between said members, the axis of pivotal movement passing within the peripheral edge of said cutter, an operating lever secured to said plates, and a coil spring interposed between the said lever and said frame tending normally to hold said cutter away from the hook portion of said frame members.

2. In an implement of the class described, the combination of a frame, a rotatable cutter having a circular peripheral cutting edge, a pair of plates carrying said cutter, means for pivotally mounting said plates in said frame, the axis of pivotal movement passing through said cutter, an operating lever secured to said plates, and means interposed between the said lever and said frame tending normally to hold said cutter in inoperative position.

3. In an implement of the class described, the combination of a frame composed of two spaced members, a pair of guard plates mounted between said frame members for oscillatory movement relative thereto, a disc cutter rotatably secured between said guard plates and having the greater portion of its cutting edge covered and protected by said plates, said cutter having a peripheral cutting edge of radius greater than the distance from its center to the axis of its oscillatory movement, an operating lever secured to said guard plates, and a spring operatively connected between said lever and said frame.

In witness whereof, I hereunto subscribe my name this 16th day of July, 1927.

MATHIAS DONKEL.